(12) United States Patent
Zhang et al.

(10) Patent No.: US 12,086,831 B2
(45) Date of Patent: Sep. 10, 2024

(54) METHOD AND SYSTEM FOR SPONSORED SEARCH RESULTS PLACEMENT IN A SEARCH RESULTS PAGE

(71) Applicant: YAHOO ASSETS LLC, New York, NY (US)

(72) Inventors: Shanshan Zhang, Beijing (CN); Qingquan Wang, Beijing (CN); Siyu Zhu, Beijing (CN); Zhuoye Ding, Beijing (CN)

(73) Assignee: YAHOO ASSETS LLC, New York, NY (US)

( * ) Notice: Subject to any disclaimer, the term of this patent is extended or adjusted under 35 U.S.C. 154(b) by 302 days.

(21) Appl. No.: 17/241,563

(22) Filed: Apr. 27, 2021

(65) Prior Publication Data
US 2021/0248643 A1 Aug. 12, 2021

Related U.S. Application Data

(63) Continuation of application No. 14/896,590, filed as application No. PCT/CN2015/081046 on Jun. 9, 2015, now abandoned.

(51) Int. Cl.
*G06Q 30/00* (2023.01)
*G06F 16/2457* (2019.01)
(Continued)

(52) U.S. Cl.
CPC ... *G06Q 30/0256* (2013.01); *G06F 16/24578* (2019.01); *G06F 16/248* (2019.01);
(Continued)

(58) Field of Classification Search
CPC .. G06Q 30/0256; G06Q 30/0269; G06N 5/04; G06N 20/00; G06F 16/24578; G06F 16/248
See application file for complete search history.

(56) References Cited

U.S. PATENT DOCUMENTS

| 8,762,364 B2 | 6/2014 | Parekh et al. |
| 9,275,113 B1 * | 3/2016 | Datar ................ G06F 16/951 |

(Continued)

FOREIGN PATENT DOCUMENTS

| CN | 103336796 A | 10/2013 |
| CN | 104462397 A | 3/2015 |

OTHER PUBLICATIONS

S. Jain and D. Garg, "Evaluating quality score of new ads," 2014 International Conference on Advances in Computing, Communications and Informatics (ICACCI), Delhi, India, 2014, pp. 13-17, doi: 10.1109/ICACCI.2014.6968335. (Year: 2014).*

(Continued)

*Primary Examiner* — Sun M Li
(74) *Attorney, Agent, or Firm* — Venable LLP

(57) ABSTRACT

The present teaching relates to placing sponsored search results based on correlation of the sponsored search results. A search query is first received at a search engine from a user. One or more keywords are further extracted from the search query. A plurality of sponsored search results related to the one or more keywords are received in response to the search query. The placement of the plurality of sponsored search results are further determined based on correlation of the plurality of sponsored search results, and a search results page containing the plurality of sponsored search results are presented to the user.

20 Claims, 14 Drawing Sheets

(51) Int. Cl.
G06F 16/248 (2019.01)
G06N 5/04 (2023.01)
G06N 20/00 (2019.01)
G06Q 30/0251 (2023.01)

(52) U.S. Cl.
CPC .............. *G06N 5/04* (2013.01); *G06N 20/00* (2019.01); *G06Q 30/0269* (2013.01)

(56) References Cited

U.S. PATENT DOCUMENTS

| | | | | |
|---|---|---|---|---|
| 9,298,779 | B1* | 3/2016 | Zhou | G06F 16/245 |
| 2009/0192983 | A1* | 7/2009 | Elango | G06F 16/951 |
| 2009/0240677 | A1* | 9/2009 | Parekh | G06F 16/9535 |
| | | | | 707/999.005 |
| 2010/0042487 | A1* | 2/2010 | Barazani | G06Q 30/02 |
| | | | | 709/224 |
| 2010/0049644 | A1 | 2/2010 | Feldman et al. | |
| 2010/0223546 | A1* | 9/2010 | Liu | G06F 16/9038 |
| | | | | 715/205 |
| 2012/0136722 | A1* | 5/2012 | Kothiwal | G06Q 30/0241 |
| | | | | 705/14.54 |
| 2012/0143672 | A1* | 6/2012 | You | G06Q 30/0247 |
| | | | | 705/14.42 |
| 2013/0144717 | A1 | 6/2013 | Williams et al. | |
| 2014/0058793 | A1* | 2/2014 | Nath | G06Q 30/02 |
| | | | | 705/7.31 |
| 2014/0181634 | A1* | 6/2014 | Compain | G06F 40/166 |
| | | | | 715/234 |
| 2015/0248416 | A1* | 9/2015 | Johnson | G06F 16/951 |
| | | | | 707/734 |
| 2016/0189234 | A1* | 6/2016 | Tang | G06Q 30/0269 |
| | | | | 705/14.66 |
| 2019/0295126 | A1* | 9/2019 | Madden | G06N 20/00 |

OTHER PUBLICATIONS

Predicting clicks in online display advertising with latent features and side-information. Machine Learning (stat.ML); Machine Learning (cs.LG); Applications (stat.AP). Cite as:arXiv:1411.7924 [stat.ML] (or arXiv: 1411.7924v1 [stat. ML] for this version) https://doi.org/10.48550/arXiv.1411.7924 (Year: 2014).*

G. Xiao, Z. Gong and J. Guo, "Personalized Scheduling Search Advertisement by Mining the History Behaviours of Users," 2009 IEEE International Conference on e-Business Engineering, Macau, China, 2009, pp. 29-36, doi: 10.1109/ICEBE.2009.14. (Year: 2009).*

A. Ashkan, C. L. A. Clarke, E. Agichtein and Q. Guo, "Estimating Ad Clickthrough Rate through Query Intent Analysis," 2009 IEEE/WIC/ACM International Joint Conference on Web Intelligence and Intelligent Agent Technology, Milan, Italy, 2009, pp. 222-229, doi: 10.1109/WI-IAT.2009.39. (Year: 2009) (Year: 2009).*

J. Bian, A. Dong, X. He, S. Reddy and Y. Chang, "User Action Interpretation for Online Content Optimization," in IEEE Transactions on Knowledge and Data Engineering, vol. 25, No. 9, pp. 2161-2174, Sep. 2013, doi: 10.1109/TKDE.2012.130. (Year: 2013).*

A. Ashkan, C. L. A. Clarke, E. Agichtein and Q. Guo, "Estimating Ad Clickthrough Rate through Query Intent Analysis, " 2009 IEEE/WIC/ACM International Joint Conference on Web Intelligence and Intelligent Agent Technology, Milan, Italy, 2009, pp. 222-229, doi: 10.1109/WI-IAT.2009.39. (Year: 2009).*

Z. Dou, R. Song, J.-R. Wen and X. Yuan, "Evaluating the Effectiveness of Personalized Web Search," in IEEE Transactions on Knowledge and Data Engineering, vol. 21, No. 8, pp. 1178-1190, Aug. 2009, doi: 10.1109/TKDE.2008.172. (Year: 2009).*

International Preliminary Report on Patentability mailed Dec. 21, 2017 in International Application PCT/CN2015/081046.

International Search Report and Written Opinion mailed Jan. 19, 2016 in International Application PCT/CN2015/081046.

* cited by examiner

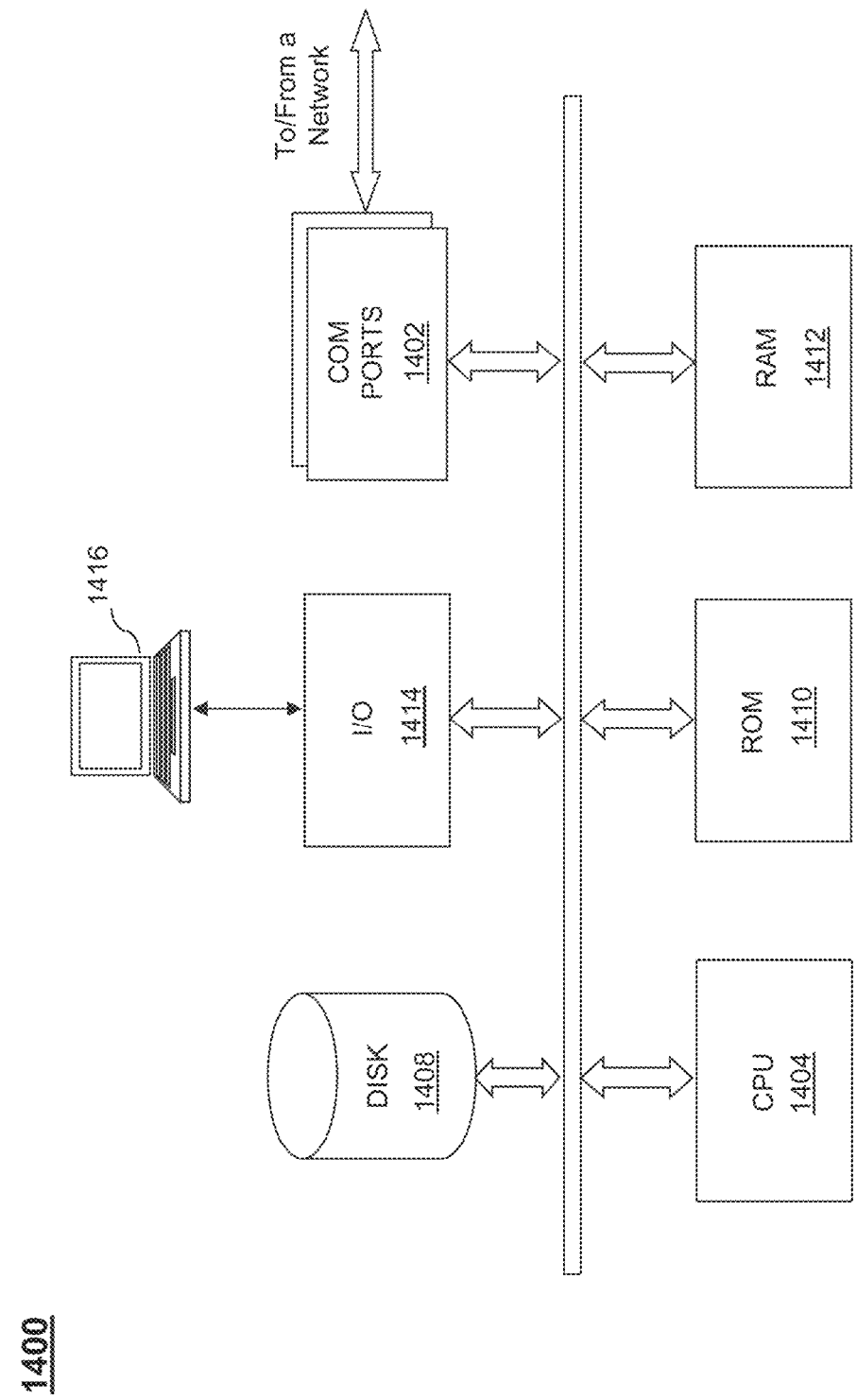

METHOD AND SYSTEM FOR SPONSORED SEARCH RESULTS PLACEMENT IN A SEARCH RESULTS PAGE

CROSS-REFERENCE TO RELATED APPLICATION

The present application is a divisional of U.S. application Ser. No. 14/896,590, filed on Dec. 7, 2015, which is a National Stage application, filed under 35 U.S.C. § 371, of International Application No. PCT/CN2015/081046, entitled "METHOD AND SYSTEM FOR SPONSORED SEARCH RESULTS PLACEMENT IN A SEARCH RESULTS PAGE," which are hereby incorporated by reference in their entireties.

BACKGROUND

1. Technical Field

The present teaching relates to methods, systems, and programming for search results placement. In particular, the present teaching relates to methods, systems, and programming for sponsored search results placement in a search results page.

2. Discussion of Technical Background

Online search methodology provides users with search results that match the users' search interest. Current search technology can offer users with suitable and personalized searching experience. In addition to the content-based search results, a search results page may also include one or more sponsored search results matching the users search keywords. The availability of placing the sponsored search results in a search results page allows the advertisers to bid for placement in a paid listing of search results on terms that are relevant to their business. The advertisers pay the amount of their bids only when a customer clicks on their listing. Therefore, good placement of sponsored search results helps the advertisers to achieve their goals or maximize the success. On the other hand, publishers that offer spaces to place the sponsored search results also benefits from improved user experience to achieve more revenue from advertising.

When a user inputs a search query on a search engine nested on a publisher web site, a bid auction on the sponsored search results spots takes place when a search for one or more keywords occurs. All bids for the one or more keywords that target the user's geographic location, the day and time of the search, etc. are then compared and a winner is determined. In situations where there are multiple spots available on the search engine results page (SERP), there can be multiple winners whose positions on the page are influenced by the amount each has bid. According to some search scheme, user behaviors are utilized to provide personalized search results. When a user inputs a search query via a publisher's website, the search engine collects the profile information associated with the user, and obtains historical behaviors of the user from a database. The search engine further analyzes the user behaviors such as browsing history, purchasing history or ad related activities via the publisher website, etc. to determine how likely the user clicks the sponsored search results and/or make purchases through the landing page links. Because various elements may affect the presentation of the sponsored search results as well as the user experience, the search engine adopts prediction models to determine the rankings and placement of the sponsored search results. For example, the search engine may construct a prediction model based on the bids and the user behaviors to determine the rankings and placement of the sponsored search results. However, bids and user behaviors related prediction focuses on the relevance of the sponsored search results and the search keywords. Information associated with the sponsored search results themselves is neglected and thus, causing a bottle-neck in the performance of the sponsored search results.

Therefore, there is a need to provide an improved solution for placing the sponsored search results to solve the above-mentioned problems.

SUMMARY

The present teaching relates to methods, systems, and programming for search results placement. In particular, the present teaching relates to methods, systems, and programming for sponsored search results placement in a search results page.

According to an embodiments of the present teaching, a method, implemented on a computing device having at least one processor, storage, and a communication platform connected to a network for placing sponsored search results in a search results page includes receiving a search query from a user: extracting one or more keywords from the search query: receiving a plurality of sponsored search results related to the one or more keywords: determining placement of the plurality of sponsored search results based on correlations of the plurality of sponsored search results: and presenting to the user, a search results page containing the plurality of sponsored search results.

In some embodiment, the method may further include obtaining profile information of the user: retrieving user behaviors from a database based on the profile information: and determining the placement of the plurality of sponsored search results based on the user behaviors.

In some embodiment, the method may further include estimating a user likelihood factor for each sponsored search result based on the user behaviors; and determining the placement of the plurality of sponsored search results based on the user likelihood factors, wherein the user likelihood factor indicates a chance that the user clicks the sponsored search result.

In some embodiment, the method may further include determining the placement of the plurality of sponsored search results based on qualities of the plurality of sponsored search results, which includes obtaining a plurality of quality factors associated with each sponsored search result: estimating a quality grade for each sponsored search result based on the plurality of quality factors: and determining the placement of the plurality of sponsored search results based on the quality grades.

In some embodiment, the method may further include obtaining a creative associated with each sponsored search result: estimating a correlation factor for each sponsored search result based on the creatives; and determining the placement of the plurality of sponsored search results based on the correlation factors, wherein the correlation factor indicates an interaction level between a sponsored search result and other sponsored search results to be placed together on the search results page.

In some embodiment, the method may further include predicting a number of clicks on each sponsored search result based on user behaviors, qualities of the plurality of sponsored search results, and the correlations of the plurality of sponsored search results using a machine learning model: and determining the placement of the plurality of sponsored search results based on the predicted numbers of clicks.

According to another embodiment of the present teaching, a method, implemented on a computing device having at least one processor, storage, and a communication platform connected to a network for placing sponsored search results in a search results page includes receiving a search query from a user: extracting one or more keywords from the search query: receiving a plurality of sponsored search results related to the one or more keywords: determining placement of the plurality of sponsored search results based on behaviors associated with the user and qualities of the plurality of sponsored search results: and presenting to the user, a search results page containing the plurality of sponsored search results.

In some embodiment, the method may further include predicting a number of clicks on each sponsored search result based on the behaviors associated with the user and the qualities of the plurality of sponsored search results using a machine learning model: and determining the placement of the plurality of sponsored search results based on the predicted numbers of clicks.

According to yet another embodiment of the present teaching, a system having at least one processor, storage, and a communication platform connected to a network for placing sponsored search results in a search results page includes a user interfacing module configured to receive a search query from a user: a keywords extractor configured to extract one or more keywords from the search query: a receiving module configured to receive a plurality of sponsored search results related to the one or more keywords: a decision module configured to determine placement of the plurality of sponsored search results based on correlations of the plurality of sponsored search results: and a presenting module configured to present to the user, a search results page containing the plurality of sponsored search results.

In some embodiment, the system may further include a user profile collector configured to obtain profile information of the user; and a user behavior analyzer configured to retrieve user behaviors from a database based on the profile information, wherein the decision module is further configured to determine the placement of the plurality of sponsored search results based on the user behaviors.

In some embodiment, the user behavior analyzer may be further configured to estimate a user likelihood factor for each sponsored search result based on the user behaviors, the user likelihood factor indicating a chance that the user clicks the sponsored search result.

In some embodiment, the decision module may be further configured to determine the placement of the plurality of sponsored search results based on qualities of the plurality of sponsored search results, which includes obtaining a plurality of quality factors associated with each sponsored search result: estimating a quality grade for each sponsored search result based on the plurality of quality factors: and determining the placement of the plurality of sponsored search results based on the quality grades.

In some embodiment, the system may further include a creative extractor configured to obtain a creative associated with each sponsored search result: and a correlation analyzer configured to estimate a correlation factor for each sponsored search result based on the creatives, the correlation factor indicating an interaction level between a sponsored search result and other sponsored search results to be placed together on the search results page, wherein the decision module is further configured to determine the placement of the plurality of sponsored search results based on the correlation factors.

In some embodiment, the system may further include a clicks prediction module configured to predict a number of clicks on each sponsored search result based on user behaviors, qualities of the plurality of sponsored search results, and the correlations of the plurality of sponsored search results using a machine learning model, wherein the decision module is further configured to determine the placement of the plurality of sponsored search results based on the predicted numbers of clicks.

According to yet another embodiment of the present teaching, a non-transitory machine-readable medium having information recorded thereon for placing sponsored search results in a search results page, wherein the information, when read by the machine, causes the machine to perform receiving a search query from a user; extracting one or more keywords from the search query: receiving a plurality of sponsored search results related to the one or more keywords: determining placement of the plurality of sponsored search results based on correlations of the plurality of sponsored search results; and presenting to the user, a search results page containing the plurality of sponsored search results.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 14 depicts a general computer architecture on which the present teaching can be implemented.

DETAILED DESCRIPTION

Figure 1:
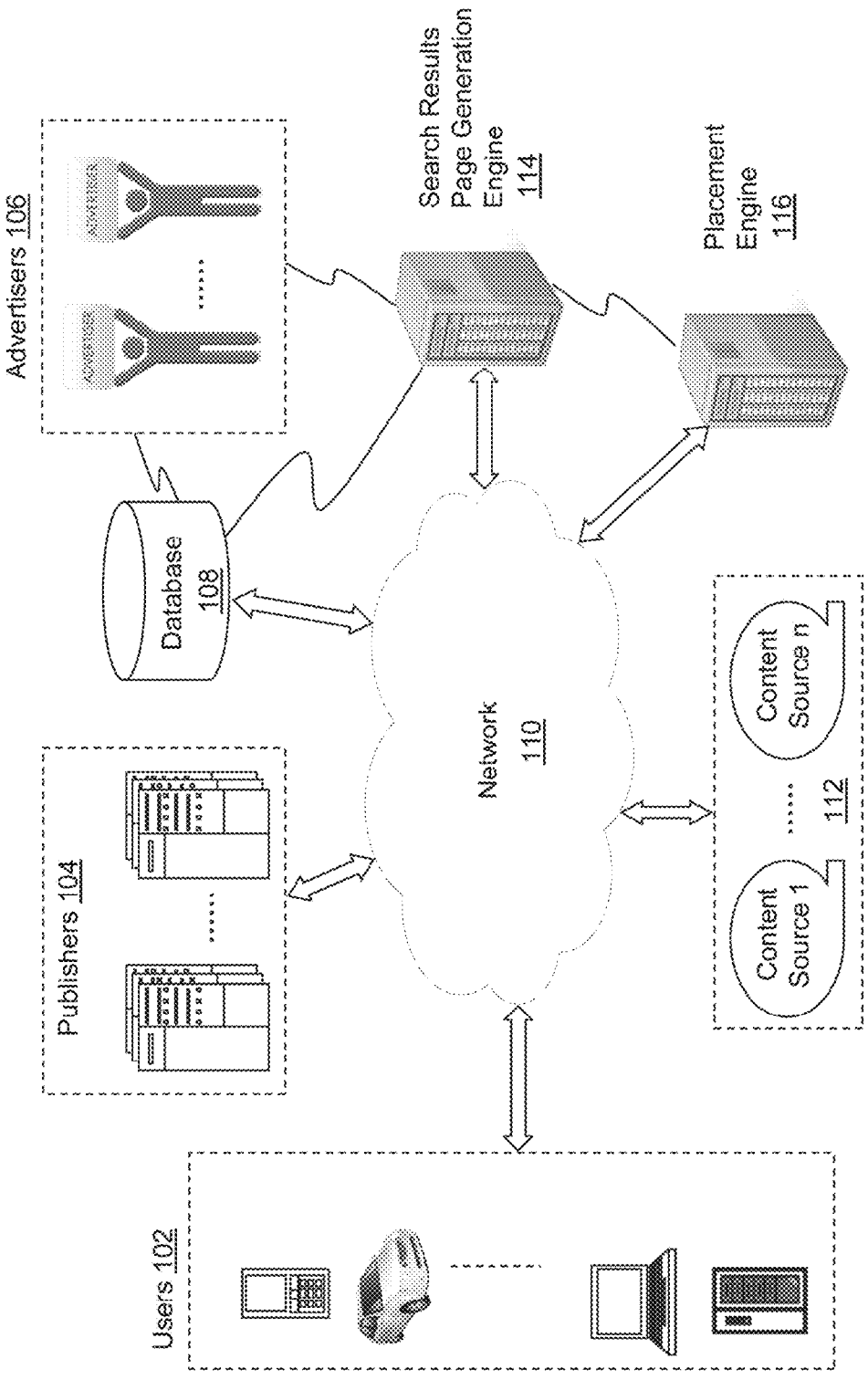
FIG. 1 illustrates an exemplary system diagram for placing sponsored search results in a search result page, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present teaching incorporates user behaviors associated with the user inputting a search query, quality factors of the sponsored search results related to the search query, and correlation factors of the sponsored search results to attain a novel and strengthened prediction model to predict numbers of clicks on the sponsored search results and determine the placement of the sponsored search results in a search results page. In particular, by evaluating the correlation influence of other sponsored search results to be placed together on the search results page, the present teaching offers the most appropriate placement of the sponsored search results as well as personalized search results that better meet the user's interest. Meanwhile, it contributes to enhance user experience with the publisher website, which in turn, keeps loyalty of the users as well as more new users.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 illustrates an exemplary system diagram for placing sponsored search results in a search result page, according to an embodiment of the present teaching. When a user 102 initiates a search on a search engine nested on a publisher website, the publisher 104 releases a bid request to the advertisers 106 via a network 110. A bid process on the available ad spots in connection with one or more search keywords automatically occurs. An intermediate agency such as an ad exchange determines the winning bids in accordance with the number of available ad spots on the publisher website. Meanwhile, the search engine searches for content-based search results from a variety of content sources 112. A search results generation engine 114 then fetches the content-based search results from the variety of content sources 112 and the sponsored search results from a database 108 to be presented to the user in accordance with the winning bids. The search results generation engine 114 further communicates with a placement engine 116 to determine the placement of the sponsored search results in accordance with the available ad spots on the publisher website.

The user 102 may connect to the network via various types of devices, for example, a desktop computer, a laptop computer, a mobile device, a built-in device in a motor vehicle, etc. The network 110 may be a single network or a combination of multiple networks. For example, the network 110 may be a local area network (LAN), a wide area network (WAN), a public network, a private network, a proprietary network, a Public Telephone Switched Network (PSTN), the Internet, a wireless communication network, a virtual network, or any combination thereof. The publisher 104 may be any entity that hosts one or more spots in its properties (e.g., web sites, applications, etc.) for presenting search results to the user 102. The publisher 104 may also be a search engine, a blogger, a television station, a newspaper issuer, a web page host, a content portal, an online service provider, or a game server. The advertiser 106 may be any entity that provides inventory to be displayed on the publisher's webpage. The inventory may be electrical devices, fashion items, soft drinks, travel services, merchandize coupons etc. In response to the search query inputted by the user 102, the advertisers 106 present the inventory related to the search keywords. According to the illustrated embodiment, the search results page generation engine 114 and the placement engine 116 operates as independent service providers and directly connect to network 110.

Figure 2:
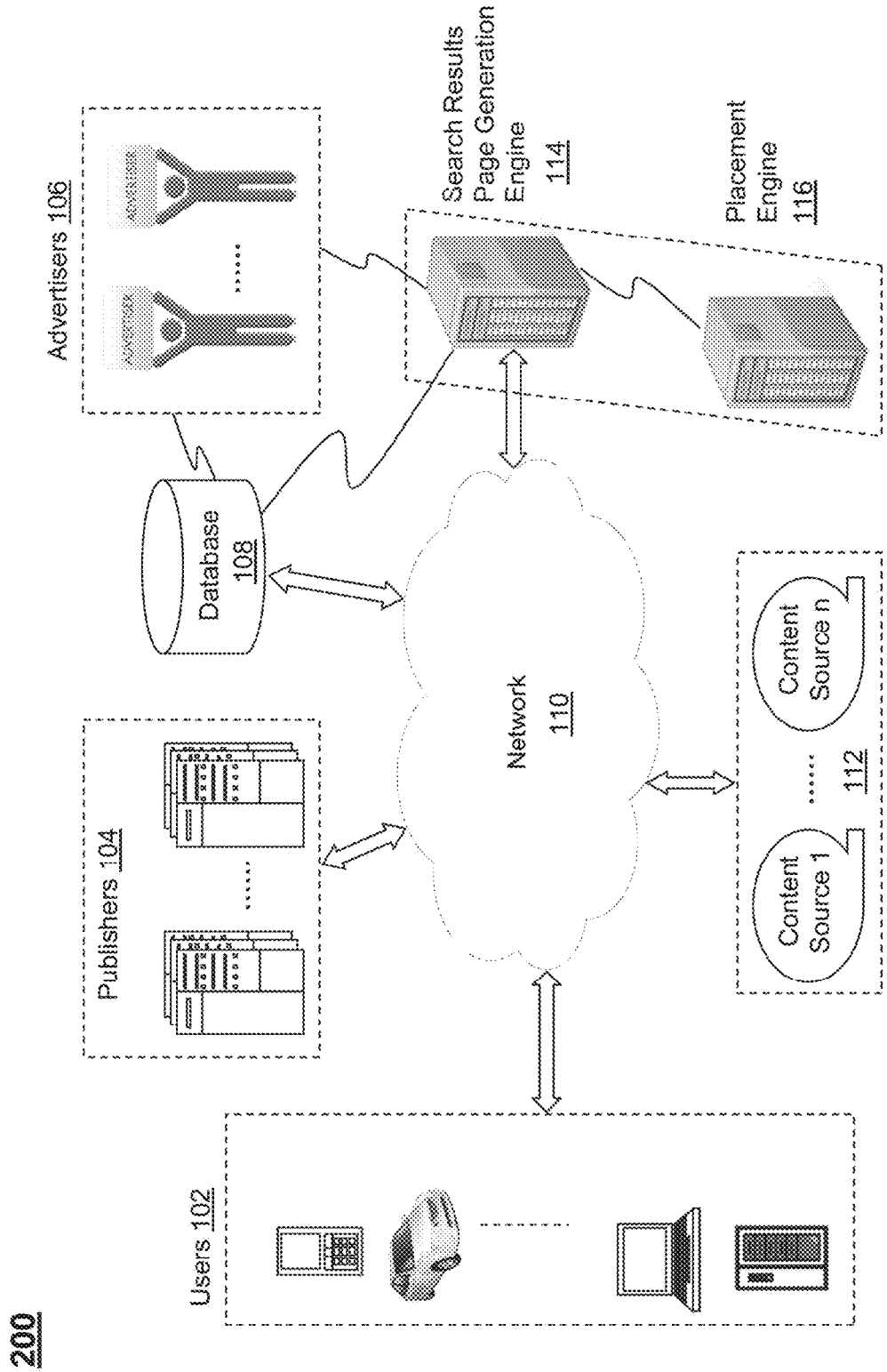
FIG. 2 illustrates an exemplary system diagram for placing sponsored search results in a search result page, according to another embodiment of the present teaching.

FIG. 2 illustrates an exemplary system diagram for placing sponsored search results in a search result page, according to another embodiment of the present teaching. The system environment illustrated herewith is similar to FIG. 1, except that the placement engine 116 operates as a backend system of the search results page generation engine 114 for determining the placement of sponsored search results in a search results page. In some embodiment, the placement engine 116 may be incorporated into the search results page generation engine 114 as one entity.

Figure 3:
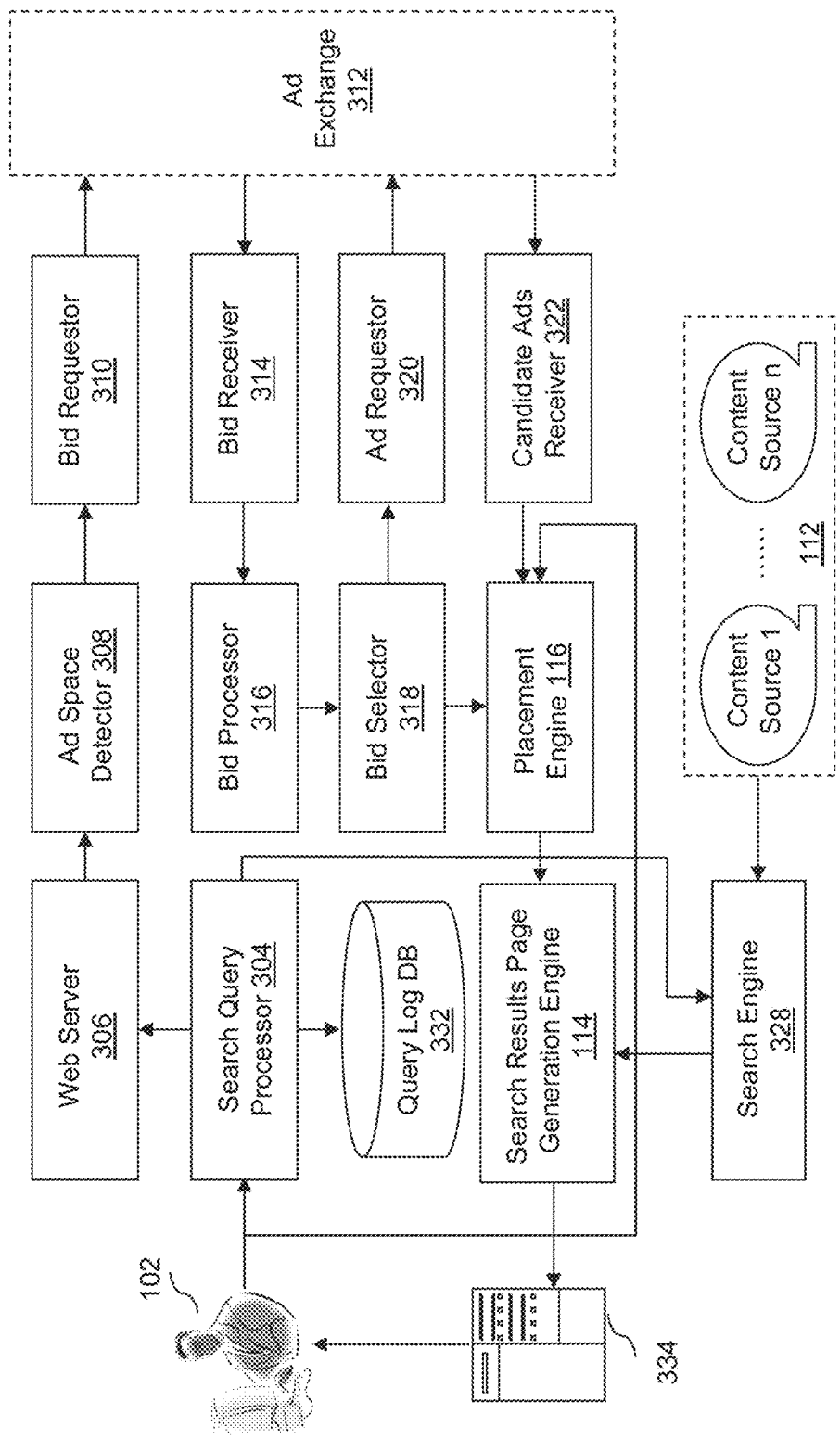
FIG. 3 illustrates an exemplary search results generation engine and placement engine, according to an embodiment of the present teaching.

FIG. 3 illustrates an exemplary search results generation engine and placement engine, according to an embodiment of the present teaching. A user 02 initiates a search query which is transmitted to a search query processor 304. Upon receiving the search query, the search query processor 304 forwards it to a web server 306, and meantime, stores the search query in a query log database 332. An ad space detector 308 detects available ad spaces on the search results page to be produced in response to the search query, and forwards the number of the available ad spaces and one or more keywords related to the search query to a bid requestor 310. A bid on the available ad spaces and related to the search keywords is generated at the bid requestor 310, and forwarded to advertisers via an ad exchange 312. A bid receiver 314 receives all bids upon the available ad spaces and the search keywords, and forwards the bids to a bid processor 316. The bid processor 316 ranks the received bids based on the amount that is bid, and forwards the bid rankings to a bid selector 318. The bid selector 318 selects a number of high bids to be placed on the available ad spaces on the search results page, and forwards the selected bids to an ad requestor 320. Upon receiving the selected bids, the ad requestor 320 sends a request to obtain ads to be placed on the search results page corresponding to the selected bids via the ad exchange 312. The ad exchange 312 further forwards the candidate ads in response to the selected bids to the candidate ads receiver 322.

According to the present embodiment, a placement engine 116 receives the candidate ads, i.e., the sponsored search results in response to the search query, and determines the arrangement of the sponsored search results on the search results page. Further, the search results generation engine 114 fetches the sponsored search results with determined arrangement from the placement engine 116 and content-based search results from various content sources 112 via a search engine 328. The search results generation engine 114 incorporates the content-based search results and the sponsored search results into a search results page 334 and presents the search results page 334 to the user 302.

Figure 4:
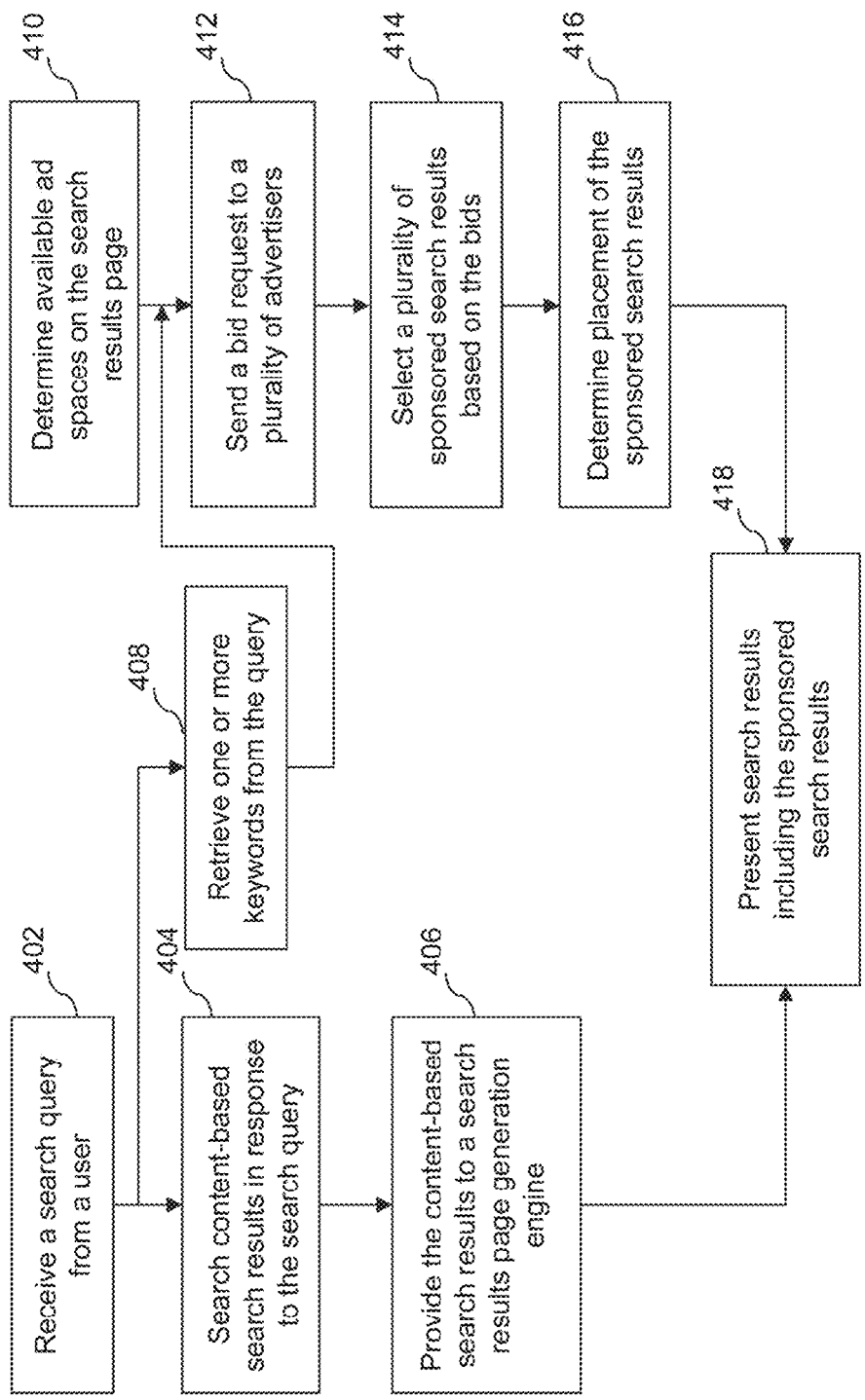
FIG. 4 illustrates an exemplary flowchart of the process for presenting a search result page including the sponsored search results, according to an embodiment of the present teaching.

FIG. 4 illustrates an exemplary flowchart of the process for presenting a search results page including the sponsored search results, according to an embodiment of the present teaching. According to the embodiment illustrated in FIG. 3, the process for presenting a search results page may include receiving a search query from a user 402: searching content-based search results in response to the search query 404: providing the content-based search results to a search results generation engine 406: retrieving one or more keywords from the search query 408: determining available ad spaces on the search results page to be produced in response to the search query 410; sending a bid request to a plurality of advertisers 412; selecting a plurality of sponsored search results based on the received bids 414; determining placement of the sponsored search results 416; and presenting search results in response to the search query including the content-based search results and the sponsored search results with the determined placement 418.

Figure 5:
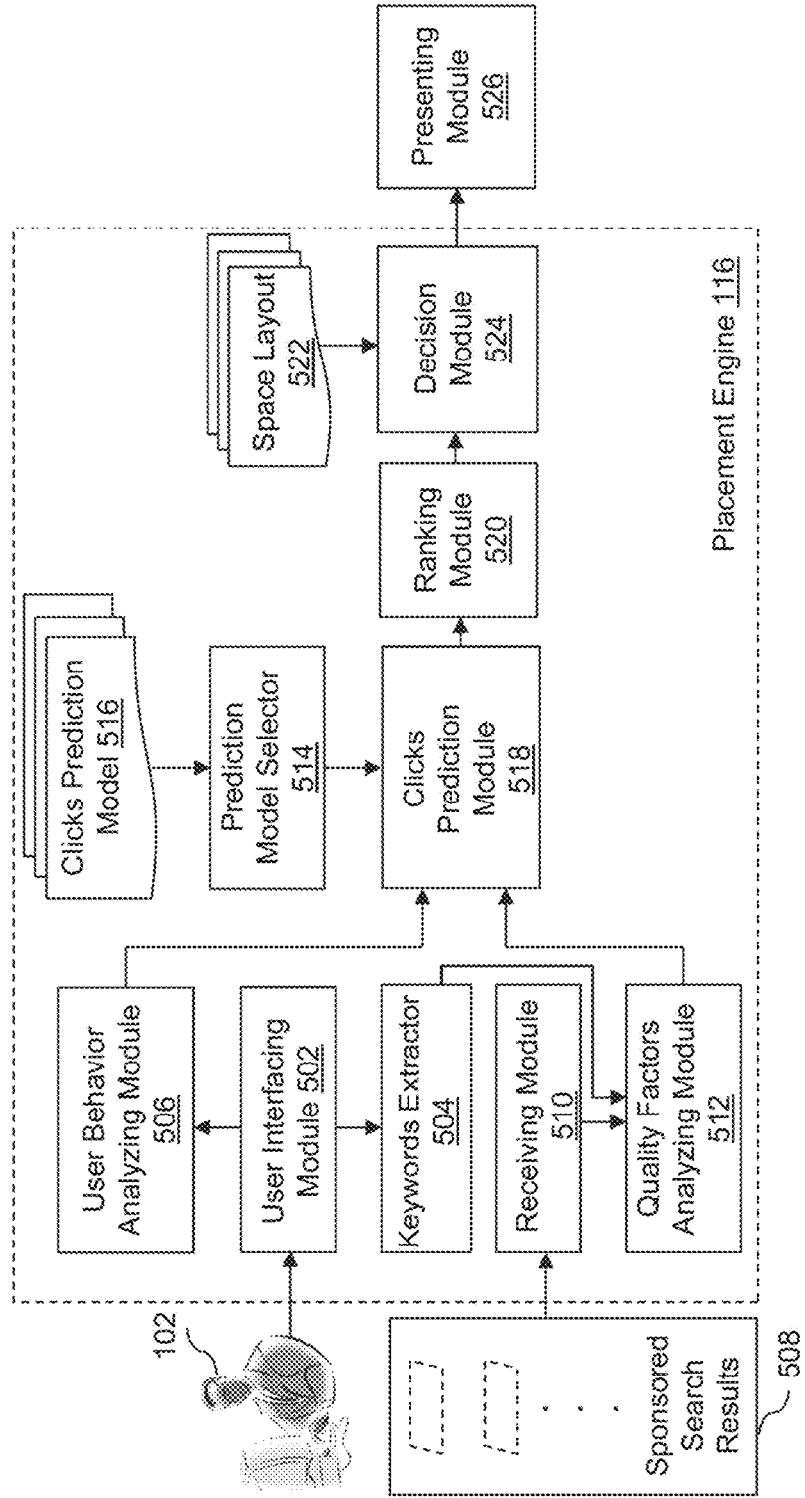
FIG. 5 illustrates an exemplary diagram of a placement engine, according to an embodiment of the present teaching.

FIG. 5 illustrates an exemplary diagram of a placement engine, according to an embodiment of the present teaching. The placement engine 116 according to the illustrated embodiment includes a user interfacing module 502 configured to receive a search query from the user 102; a keyword extractor 504 configured to extract one or more keywords from the received search query: a receiving module 510 configured to receive a plurality of sponsored search results related to the extracted keywords 508: a decision module 524 configured to determine placement of the plurality of sponsored search results based on a variety of factors; and a presenting module 526 configured to present the search results page containing the plurality of sponsored search results.

In some embodiment, the placement engine 116 may further include a user behavior analyzing module 506 configured to retrieve behavior information associated with the user from a database, analyze the behavior information, and provide the behavior related factor for predicting clicks on the sponsored search results.

In some embodiment, the placement engine 116 may further include a quality factors analyzing module 512 configured to obtain a plurality of quality factors associated with each sponsored search result, analyze the plurality of quality factors, and provide the quality related factors for predicting clicks on the sponsored search results.

In some embodiment, the placement engine 116 may further include a clicks prediction module 518 configured to receive inputs from the user behavior analyzing module 506 and the quality factor analyzing module 512, and predict a number of clicks on each sponsored search result to be placed on the search results page. The clicks prediction module 518 may select one of the clicks prediction models 516 via a prediction model selector 514. In some embodiment, the clicks prediction model is trained to evaluate each sponsored search result using historical data related to the performance of the sponsored search results. According to the present embodiment, the clicks prediction module 518 selects a trained machine learning model for clicks prediction.

In some embodiment, the placement engine 116 may further includes a ranking module 520 configured to rank the plurality of sponsored search results based on the results of the clicks prediction, and forward the rankings to the decision module 524 to determine the placement. In some embodiment, the decision module 524 may refer to a space layout 522 to determine the actual positions of the available ad spots on the search results page.

Figure 6:
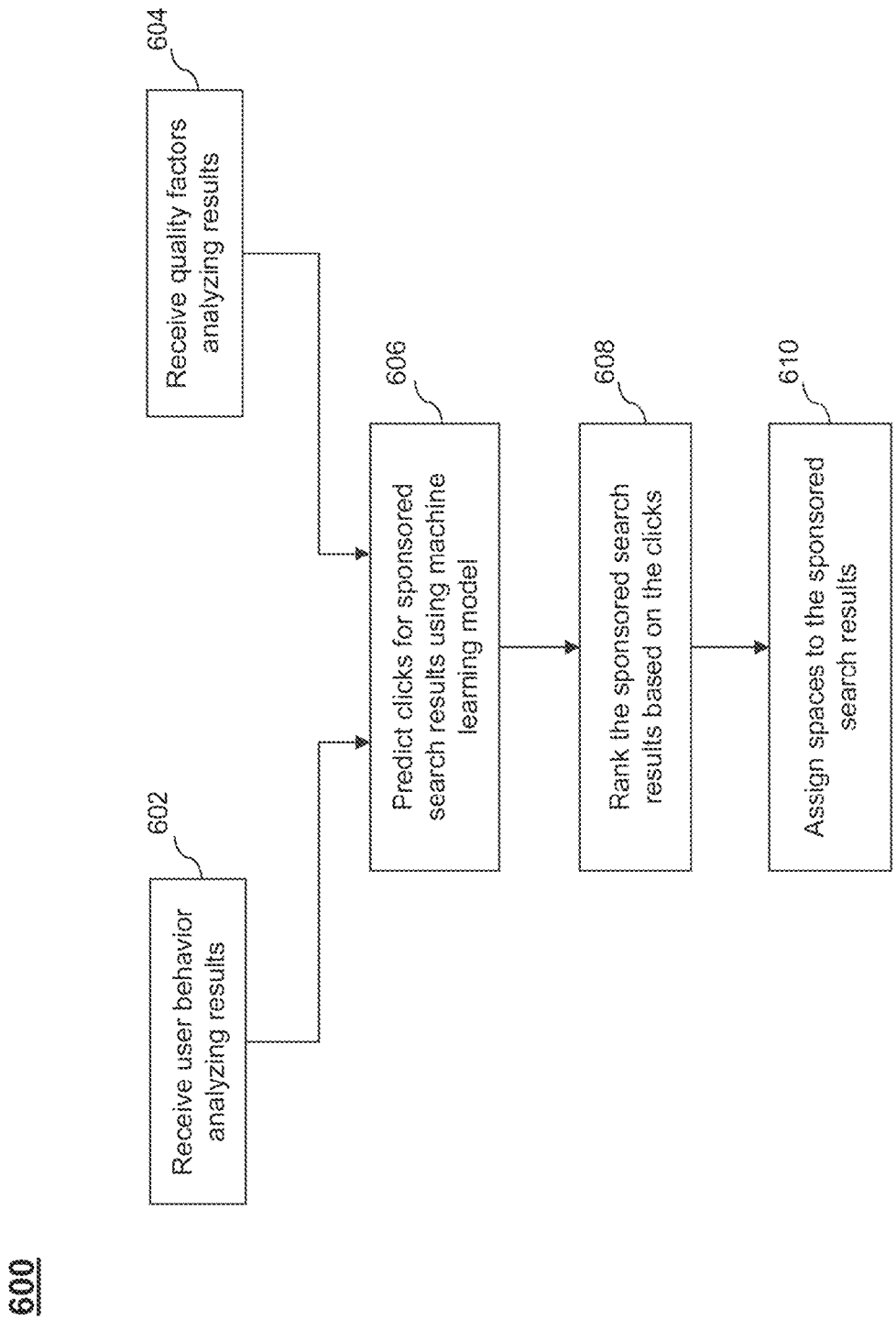
FIG. 6 illustrates an exemplary flowchart of the process for placing the sponsored search results, according to an embodiment of the present teaching.

FIG. 6 illustrates an exemplary flowchart of the process for placing the sponsored search results, according to an embodiment of the present teaching. According to the embodiment illustrated in FIG. 5, the process for placing the sponsored search results may include receiving user behavior analyzing results 602: receiving quality factors analyzing results 604; predicting clicks for sponsored search results using machine learning model 606; ranking the sponsored search results based on the clicks prediction 608: and assigning spaces to the sponsored search results 610 based on the ranking.

Figure 7:
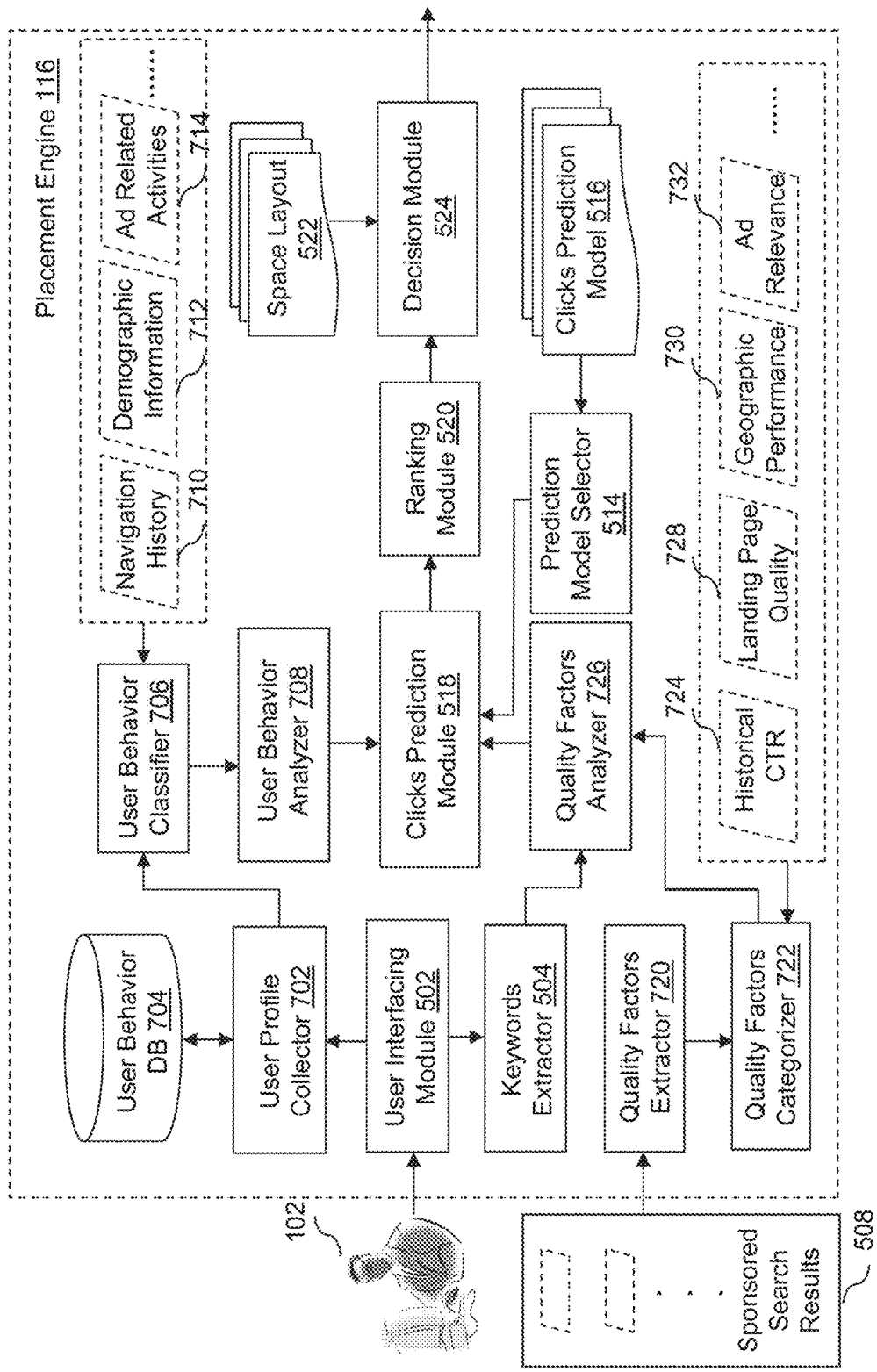
FIG. 7 illustrates an exemplary diagram of a placement engine, according to another embodiment of the present teaching.

FIG. 7 illustrates an exemplary diagram of a placement engine, according to another embodiment of the present teaching. According to the illustrated embodiment, the user behavior analyzing module 506 shown in FIG. 5 may further include a user profile collector 702 configured to obtain profile information of the user inputting the search query via the user interfacing module 502: a user behavior classifier 706 configured to classify the user behaviors into different categories: and a user behavior analyzer 708 configured to retrieve the user behaviors from a database 704 based on the profile information, and estimate a user likelihood factor for each sponsored search result. In some embodiment, the user behavior database 704 may store the user behaviors being observed on the publisher web site in the past time periods. The user behaviors may be allocated into different categories such as navigation history 710, demographic information 712, ad activities 714, etc. The clicks prediction module 518 may apply long-term historical user behaviors and/or short-term historical user behaviors to achieve more accurate prediction. The In some embodiment, the estimated likelihood factor indicates a chance that the user clicks the sponsored search result based on the user behaviors in the past.

In some embodiment, the user behavior analyzing module 506 shown in FIG. 5 may further include a quality factors extractor 720 configured to obtain a plurality of quality factors associated with each sponsored search result: a quality factors categorizer 722 configured to classify the ad quality indicators: and a quality factors analyzer 726 configured to estimate a quality grade for each sponsored search result based on the quality factors. In some embodiment, the quality factors of an ad, i.e., a sponsored search result may be defined in multiple categories such as historical click through ratio (CTR) 724, landing page quality 728, geographic performance 730, ad relevance 732, etc.

Figure 8:
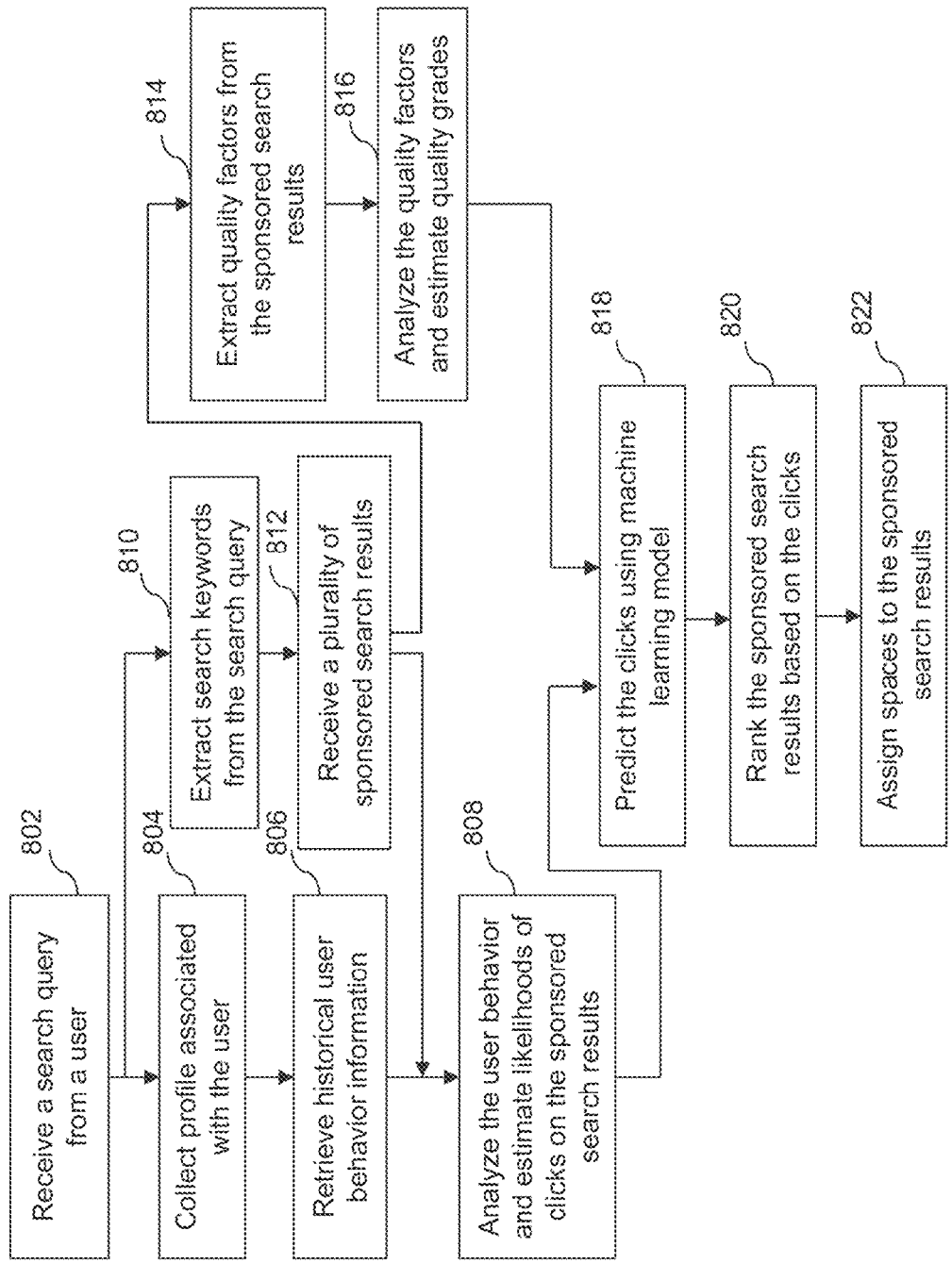
FIG. 8 illustrates an exemplary flowchart of the process for placing the sponsored search results, according to another embodiment of the present teaching.

FIG. 8 illustrates an exemplary flowchart of the process for placing the sponsored search results, according to another embodiment of the present teaching. According to the embodiment in FIG. 7, the process for placing the sponsored search results may include receiving a search query from a user 802: collecting profile information associated with the user 804; retrieving historical user behavior information 806; extracting search keywords from the search query 810; receiving a plurality of sponsored search results 812 based on the user behaviors and the quality factors: analyzing the user behaviors and estimating likelihoods of clicks on the sponsored search results based on the user behaviors 808.

In some embodiment, the process for placing the sponsored search results may further include extracting quality factors from the sponsored search results 814; analyzing the quality factors and estimating quality factors for the sponsored search results 816; predicting the clicks on the sponsored search results using a trained machine learning model 818: ranking the sponsored search results based on the predicted clicks 820; and assigning available ad spaces to the sponsored search results 822.

Figure 9:
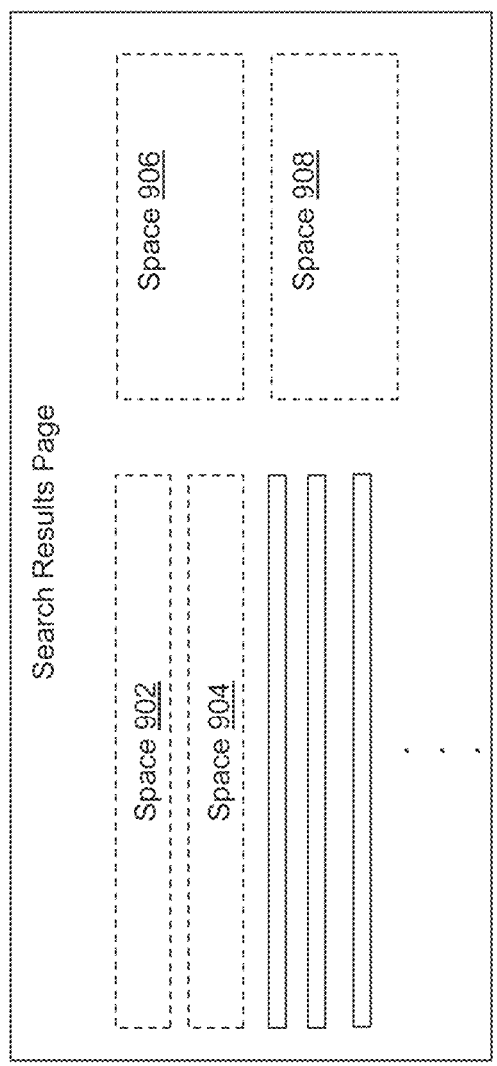
FIG. 9 illustrates an exemplary placement of the sponsored search results, according to an embodiment of the present teaching.

FIG. 9 illustrates an exemplary placement of the sponsored search results, according to an embodiment of the present teaching. An exemplary search result page includes four ad spaces: space 902, space 904, space 906, and space 908. Four ads (Ad #1, Ad #2, Ad #3, and Ad #4) are selected to be placed in spaces 902-908, respectively. An initial ranking of the four ads based on the amount they bid shows that Ad #1 ranks at a first place, Ad #2 ranks at a second place, Ad #3 ranks at a third place, and Ad #4 ranks at a fourth place. Further, quality factors analysis results show that Ad #1 has low quality, Ad #2 has high quality, Ad #3 has high quality, and Ad #4 has medium quality. Even further, user behaviors analysis results show that Ad #1 receives low user likelihood to click, Ad #2 receives low user likelihood to click, Ad #3 receives high user likelihood to click, and Ad #4 receives medium user likelihood to click. Based on the quality factors analysis and the user behaviors analysis, Ad #1 is predicted to have 5,000 clicks, Ad #2 is predicted to have 15,000 clicks, Ad #3 is predicted to have 20,000 clicks, and Ad #4 is predicted to have 8,000 clicks. Based on the predicted clicks on the four ads, the final ranking differs from the initial ranking in that Ad #3 ranks at the first place, Ad #4 ranks at the third place, and Ad #1 ranks at the fourth place. Accordingly, Ad #3 is placed in space 902, Ad #2 is placed in space 904, Ad #4 is placed in space 906, and Ad #1 is placed in space 908.

According to the embodiments set forth above, predicting ad clicks in accordance with the user behaviors and the ads quality factors not only provides the user with suitable sponsored search results placement and personalized searching experience, but also increases the revenue of the publisher web site by more accurate ad displaying.

Figure 10:
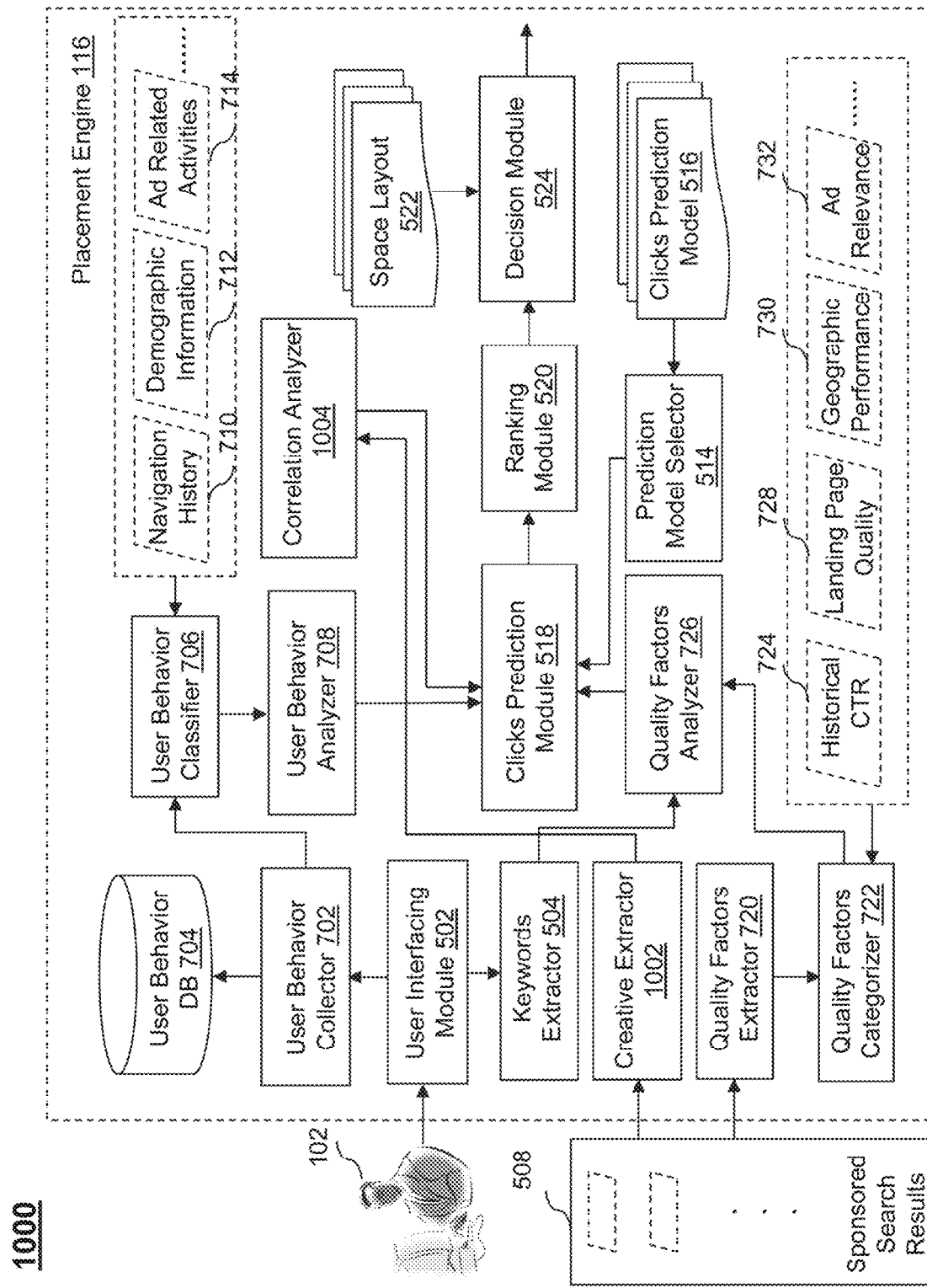
FIG. 10 illustrates an exemplary diagram of a placement engine, according to yet another embodiment of the present teaching.

FIG. 10 illustrates an exemplary diagram of a placement engine, according to yet another embodiment of the present teaching. According to the illustrated embodiment, the placement engine 116 shown in FIG. 7 may further include a creative extractor 1002 configured to obtain a creative associated with each sponsored search results: and a correlation analyzer 1004 configured to estimate a correlation factor for each sponsored search result based on the creatives. The correlation factor in the present embodiment indicates an interactional level between a sponsored search result and other sponsored search results to be placed together on the search results page. The estimated correlation factors are further inputted into the clicks prediction module 518 to estimate the clicks on the sponsored search results.

In some embodiment, the ad creative includes all the information for visually rendering the ad itself on a publisher web site such as descriptions, format, extensions (i.e., site links), layout, etc.

On the contrary to the embodiment shown in FIG. 7, which focuses on individual sponsored search result itself, the present embodiment introduces the correlation influence of other sponsored search results to be placed in the same page to provide more appropriate display. For example, if higher ranked ads have at least one "very good" ad, current ad is less likely to be clicked: or if all higher ranked ads are not "very good," current one is more likely to be clicked. Thus, utilizing the correlation influence of other sponsored search results in addition to the user behaviors and the ad quality factors can produce more accurate prediction on the ad clicks, which leads to more appropriate ad placement.

Figure 11:
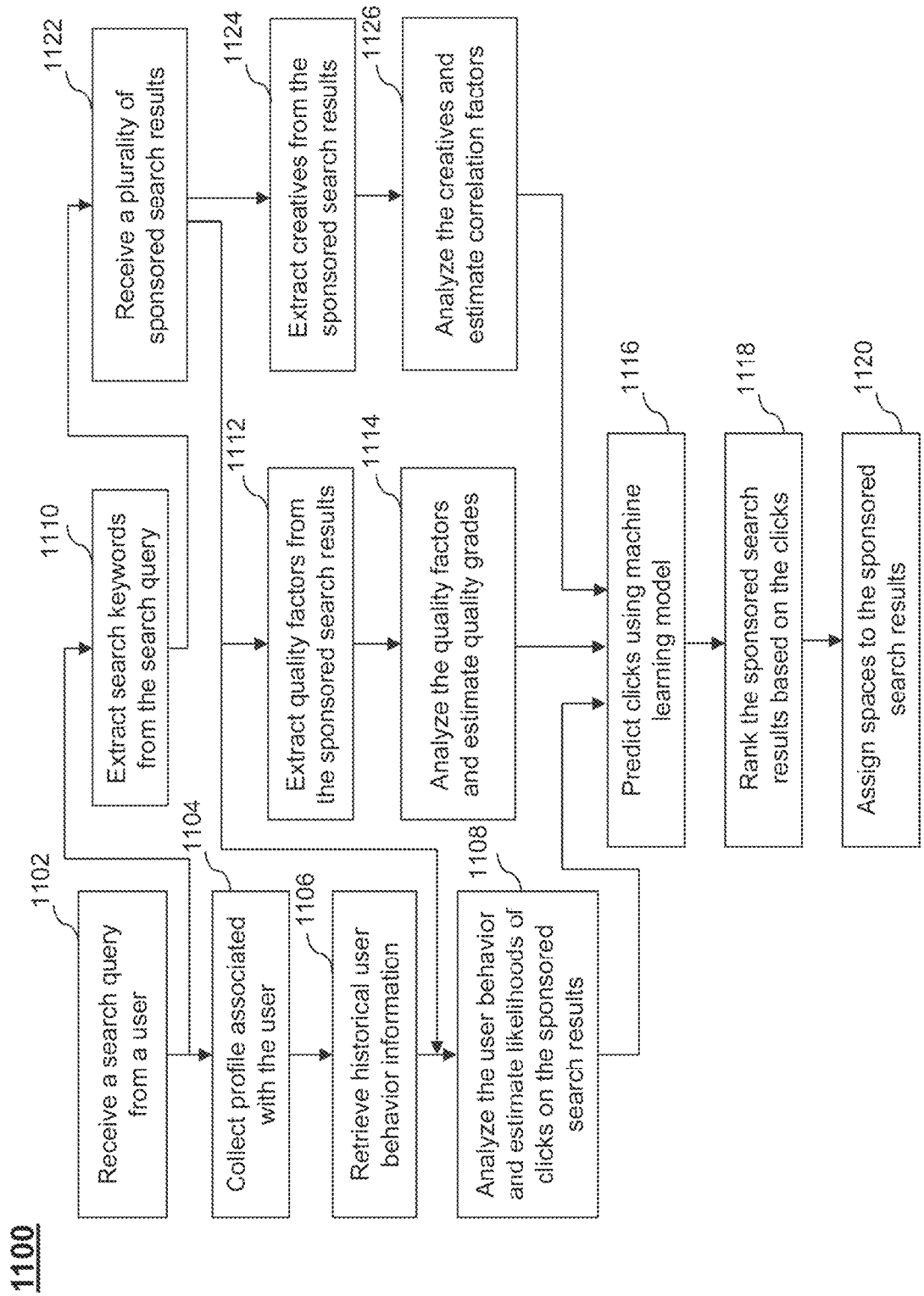
FIG. 11 illustrates an exemplary flowchart of the process for placing the sponsored search results, according to yet another embodiment of the present teaching.

FIG. 11 illustrates an exemplary flowchart of the process for placing the sponsored search results, according to yet another embodiment of the present teaching. According to the embodiment illustrated in FIG. 10, the process for placing the sponsored search results may include receiving a search query from a user 1102: collecting profile information associated with the user 1104; retrieving historical user behavior information 1106; extracting search keywords from the search query 1110: receiving a plurality of sponsored search results in response to the search query 1122: analyzing the user behaviors and estimating likelihoods of clicks on the sponsored search results 1108; extracting quality factors from the sponsored search results 1112: analyzing the quality factors and estimating the quality grades 1114; extracting creatives from the sponsored search results 1124; analyzing the creatives and estimating correlation factors for the sponsored search results 1126: predicting clicks using a machine learning model based on the user behaviors, quality factors, and correlation factors 1116; ranking the sponsored search results based on the clicks prediction 1118: and assigning spaces to the sponsored search results 1120.

Figure 12:
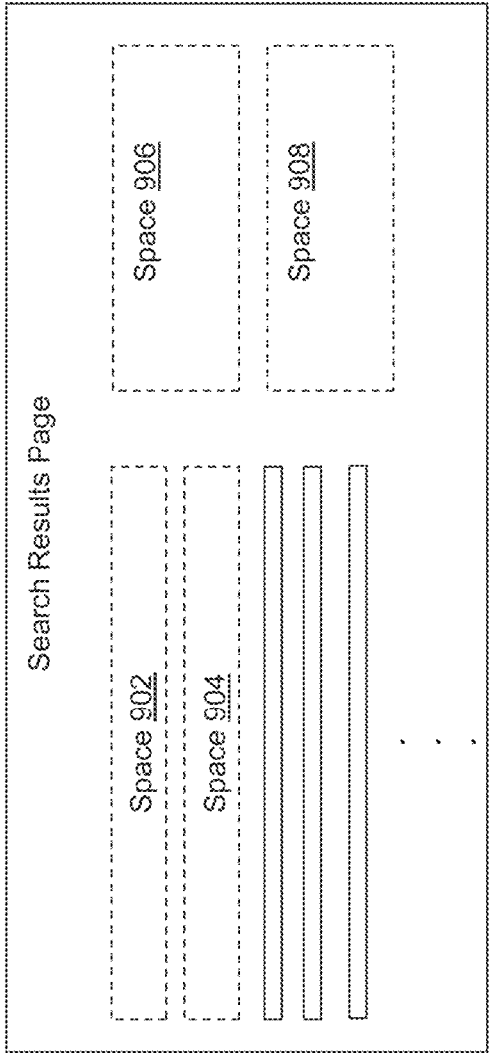
FIG. 12 illustrates an exemplary placement of the sponsored search results, according to another embodiment of the present teaching.

FIG. 12 illustrates an exemplary placement of the sponsored search results, according to another embodiment of the present teaching. The exemplary placement introduces an additional correlation factor estimation to predict the clicks on the sponsored search results. The analysis on the quality factors and the user behaviors shows the same results as in FIG. 9. In addition, the correlation factors analysis shows that Ad #1 receives low influence from other ads, Ad #2 receives low influence from other ads, Ad #3 receives high influence from other ads, and Ad #4 receives medium influence from other ads. The clicks prediction by incorporating the correlation factors analysis shows that Ad #1 is predicted to have 6,000 clicks, Ad #2 is predicted to have 19,000 clicks, Ad #3 is predicted to have 18,000 clicks, and Ad #4 is predicted to have 8,000 clicks. The final ranking by incorporating the correlation factors analysis shows that Ad #2 exceeds Ad #3, and ranks at the first place. Consequently, Ad #2 replaces Ad #3 to be placed on the best ad space 902.

The present embodiment combines the user behaviors, the sponsored search result internal features (i.e., the quality factors), and the sponsored search result external features (i.e., the correlation factors) to attain a strengthened prediction model. In particular, by evaluating the impact of other sponsored search results to be placed together on the search results page, the present teaching offers the most appropriate placement of the sponsored search results, improves user experience, and attracts more new users.

Figure 13:
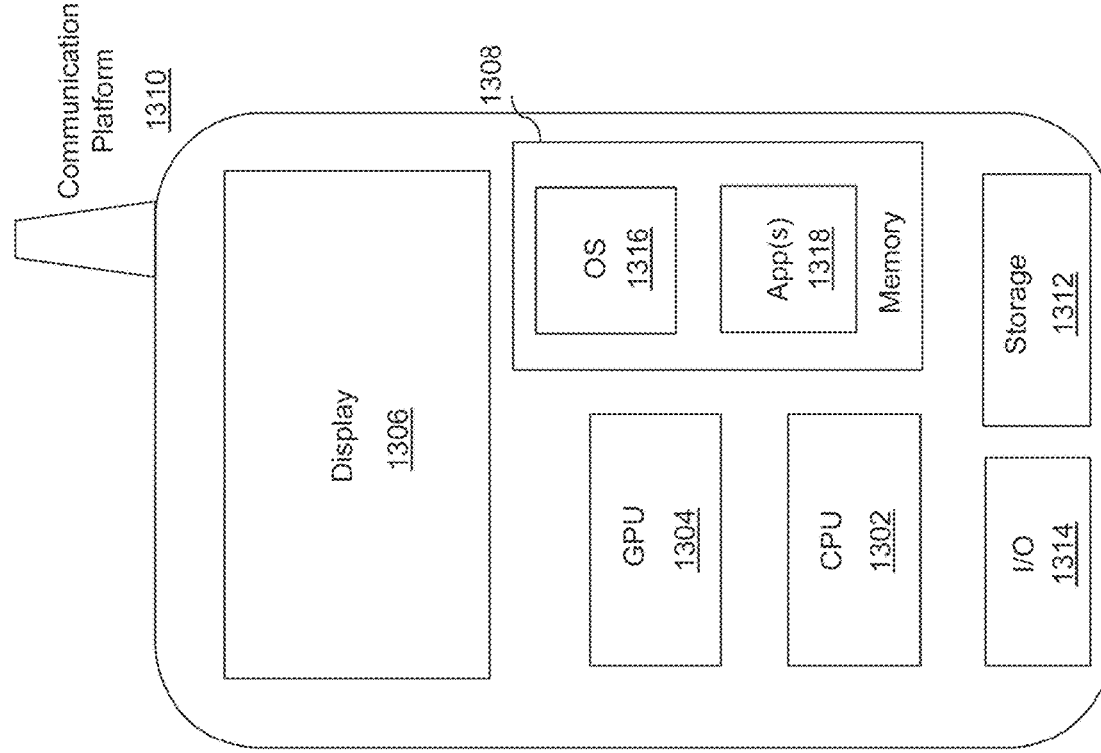
FIG. 13 depicts a general mobile device architecture on which the present teaching can be implemented.

FIG. 13 depicts a general mobile device architecture on which the present teaching can be implemented. In this example, the user device is a mobile device 1300, including but is not limited to, a smart phone, a tablet, a music player, a handled gaming console, a global positioning system (GPS) receiver, a smart-TV, wearable devices, etc. The mobile device 1300 in this example includes one or more central processing units (CPUs) 1302, one or more graphic processing units (GPUs) 1304, a display 1306, a memory 1308, a communication platform 1310, such as a wireless communication module, storage 1312, and one or more input/output (I/O) devices 1314. Any other suitable component, such as but not limited to a system bus or a controller (not shown), may also be included in the mobile device 1300. As shown in FIG. 13, a mobile operating system 1316, e.g., iOS, Android, Windows Phone, etc., and one or more applications 1318 may be loaded into the memory 1308 from the storage 1312 in order to be executed by the CPU 1302. The applications 1318 may include a browser or any other suitable mobile apps for sending a search query and rendering the search results page including the sponsored search results page through the mobile device 1300. Execution of the applications 1318 may cause the mobile device 1300 to perform the processing as described above in the present teaching. For example, presentation of a search results page including sponsored search results may be made by the GPU 1304 in conjunction with the display 1306. A request for loading a search results page in response to a search query may be inputted by the user via the I/O devices 1314 and transmitted via the communication platform 1310.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

FIG. 14 depicts a general computer architecture on which the present teaching can be implemented and has a functional block diagram illustration of a computer hardware platform that includes user interface elements. The computer may be a general-purpose computer or a special purpose computer. This computer 1400 can be used to implement any components of the system for placing sponsored search results in a search results page as described herein. Different components of the systems disclosed in the present teaching can all be implemented on one or more computers such as computer 1400, via its hardware, software program, firmware, or a combination thereof. Although only one such computer is shown, for convenience, the computer functions relating to placing the sponsored search results page may be implemented in a distributed fashion on a number of similar platforms, to distribute the processing load.

The computer 1400, for example, includes COM ports 1402 connected to and from a network connected thereto to facilitate data communications. The computer 1400 also includes a CPU 1404, in the form of one or more processors, for executing program instructions. The exemplary computer platform includes an internal communication bus 1406, program storage and data storage of different forms, e.g., disk 1408, read only memory (ROM) 1410, or random access memory (RAM) 1412, for various data files to be processed and/or communicated by the computer, as well as possibly program instructions to be executed by the CPU 1404. The computer 1400 also includes an I/O component 1414, supporting input/output flows between the computer and other components therein such as user interface elements 1416. The computer 1400 may also receive programming and data via network communications.

Hence, aspects of the methods of placing sponsored search results in a search results page, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables: copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on at least one computing device each of which has at least one processor, storage, and a communication platform connected to a network for generating a search results webpage, the method comprising:
   receiving, by a computing system, a search query from a user;
   identifying, by the computing system, a set of content items based on the search query;
   obtaining, by the computing system, interaction information related to prior interactions of the user with content items that are similar to the set of content items;
   generating, by the computing system, for each of the set of content items, a correlation factor indicating an amount of influence on the content item from other content items of the set of content items when the content item and one of the other content items are displayed together on a same search result webpage;
   combining, by the computing system, data representing user behaviors with respect to the set of content items, quality factors each associated with a corresponding content item of the set of content items, and the correlation factors for the set of content items to obtain combined data;
   training, by the computing system via machine learning based on the combined data, a prediction model for predicting clicks with respect to content items;
   estimating, by the computing system according to the prediction model, a number of clicks yielded from each of the set of content items;
   determining, by the computing system, a configuration of positions on the search result webpage for the set of content items based on the estimated number of clicks thereof;
   generating, by the computing system, the search result webpage comprising the set of content items displayed according to the configuration to personalize searching experience of the user and to improve accuracy of ad displaying; and
   providing, by the computing system, the search result webpage to the user.

2. The method of claim 1, wherein the amount of fluence is an amount of fluence on likelihood of the content item being clicked when the content item and the one of the other content items are displayed on the same search result webpage.

3. The method of claim 1, further comprising:
   selecting the trained prediction model to predict the number of clicks for each of the set of content items.

4. The method of claim 1, further comprising obtaining the data representing the user behaviors by:
   allocating each of the user behaviors into one or more categories; and
   estimating a user likelihood factor indicating a likelihood that the user will click on each of the set of content items based on the user behaviors allocated to the one or more categories.

5. The method of claim 1, further comprising:
   detecting, in response to receiving the search query, available spaces on the search result webpage, wherein each content item of the set of content items is to be assigned to one of the available spaces based on the number of clicks estimated for each content item of the set of content items.

6. The method of claim 1, wherein the quality factor indicates one of different levels of quality.

7. The method of claim 6, wherein multiple content items of the set of content items have a same quality factor, and one of the multiple content items has a correlation factor higher than that of another one of the multiple content items, and the estimated number of clicks of one of the multiple content items is less than that of the another one of the multiple content items.

8. The method of claim 1, wherein identifying the set of content items comprises:
   extracting one or more keywords from the search query; and
   determining the set of content items based on the one or more keywords.

9. The method of claim 1, wherein the configuration of positions on the search result webpage is determined such that a maximum number of clicks predicted for each content item of the set of content items is obtained.

10. The method of claim 1, wherein determining the configuration of positions on the search result webpage for the set of content items comprises:
    determining a ranking of each content item of the set of content items based on the number of clicks estimated for each content item of the set of content items, wherein the configuration of positions is determined based on the ranking of each content item of the set of content items and available positions on the search result webpage for placing each content item of the set of content items.

11. A non-transitory computer-readable medium storing computer program instructions that, when executed by one or more processors, effectuate operations comprising:

receiving, by a computing system, a search query from a user;

identifying, by the computing system, a set of content items based on the search query;

obtaining, by the computing system, interaction information related to prior interactions of the user with content items that are similar to the set of content items;

generating, by the computing system, for each of the set of content items, a correlation factor indicating an amount of influence on the content item from other content items of the set of content items when the content item and one of the other content items are displayed together on a same search result webpage;

combining, by the computing system, data representing user behaviors with respect to the set of content items, quality factors each associated with a corresponding content item of the set of content items, and the correlation factors for the set of content items to obtain combined data;

training, by the computing system via machine learning based on the combined data, a prediction model for predicting clicks with respect to content items;

estimating, by the computing system according to the prediction model, a number of clicks yielded from each of the set of content items;

determining, by the computing system, a configuration of positions on the search result webpage for the set of content items based on the estimated number of clicks thereof;

generating, by the computing system, the search result webpage comprising the set of content items displayed according to the configuration to personalize searching experience of the user and to improve accuracy of ad displaying; and providing, by the computing system, the search result webpage to the user.

12. The non-transitory computer-readable medium of claim 11, wherein the amount of fluence is an amount of fluence on likelihood of the content item being clicked when the content item and the one of the other content items are displayed on the same search result webpage.

13. The non-transitory computer-readable medium of claim 11, wherein the operations further comprise:
selecting the trained prediction model to predict the number of clicks for each of the set of content items.

14. The non-transitory computer-readable medium of claim 11, further comprising obtaining the data representing the user behaviors by:
allocating each of the user behaviors into one or more categories; and
estimating a user likelihood factor indicating a likelihood that the user will click on each of the set of content items based on the user behaviors allocated to the one or more categories.

15. The non-transitory computer-readable medium of claim 11, wherein the operations further comprise:
detecting, in response to receiving the search query, available spaces on the search result webpage, wherein each content item of the set of content items is to be assigned to one of the available spaces based on the number of clicks estimated for each content item of the set of content items.

16. The non-transitory computer-readable medium of claim 11, wherein the quality factor indicates one of different levels of quality,
multiple content items of the set of content items have a same quality factor, and one of the multiple content items has a correlation factor higher than that of another one of the multiple content items, and the estimated number of clicks of one of the multiple content items is less than that of the another one of the multiple content items.

17. The non-transitory computer-readable medium of claim 11, wherein identifying the set of content items comprises:
extracting one or more keywords from the search query; and
determining the set of content items based on the one or more keywords.

18. The non-transitory computer-readable medium of claim 11, wherein the configuration of positions on the search result webpage is determined such that a maximum number of clicks predicted for each content item of the set of content items is obtained.

19. The non-transitory computer-readable medium of claim 11, wherein determining the configuration of positions on the search result webpage for the set of content items comprises:
determining a ranking of each content item of the set of content items based on the number of clicks estimated for each content item of the set of content items, wherein the configuration of positions is determined based on the ranking of each content item of the set of content items and available positions on the search result webpage for placing each content item of the set of content items.

20. A computing system, comprising:
memory storing computer program instructions; and
one or more processors configured to execute the computer program instructions to effectuate operations comprising:
receiving, by the computing system, a search query from a user;
identifying, by the computing system, a set of content items based on the search query;
obtaining, by the computing system, interaction information related to prior interactions of the user with content items that are similar to the set of content items;
generating, by the computing system, for each of the set of content items, a correlation factor indicating an amount of influence on the content item from other content items of the set of content items when the content item and one of the other content items are displayed together on a same search result webpage;
combining, by the computing system, data representing user behaviors with respect to the set of content items, quality factors each associated with a corresponding content item of the set of content items, and the correlation factors for the set of content items to obtain combined data;
training, by the computing system via machine learning based on the combined data, a prediction model for predicting clicks with respect to content items;
estimating, by the computing system according to the prediction model, a number of clicks yielded from each of the set of content items;
determining, by the computing system, a configuration of positions on the search result webpage for the set of content items based on the estimated number of clicks thereof;
generating, by the computing system, the search result webpage comprising the set of content items displayed according to the configuration to personalize searching experience of the user and to improve accuracy of ad displaying; and providing, by the computing system, the search result webpage to the user.

\* \* \* \* \*